Nov. 15, 1966 H. W. COLE, JR 3,285,527

ENDLESS TAPE WINDING DEVICES

Filed Nov. 21, 1963 3 Sheets-Sheet 1

INVENTOR.
Howard W. Cole, Jr.
BY Emery, Whittemore
Sandoe & Graham
ATTORNEYS

Nov. 15, 1966 H. W. COLE, JR 3,285,527

ENDLESS TAPE WINDING DEVICES

Filed Nov. 21, 1963 3 Sheets-Sheet 2

INVENTOR.

Howard W. Cole, Jr.

BY Emery, Whittemore, Sandoe & Graham

ATTORNEYS

INVENTOR.

Howard W. Cole Jr.

BY Emery, Whittemore, Scrivener & Graham

ATTORNEYS 3,285,527

ENDLESS TAPE WINDING DEVICES

Howard W. Cole, Jr., 12 Vale Drive, Mountain Lakes, N.J.

Filed Nov. 21, 1963, Ser. No. 325,301
16 Claims. (Cl. 242—55.19)

This application is a continuation-in-part of application Serial No. 73,789, filed December 5, 1960, and subsequently abandoned.

This invention relates to the storage and using of film strips, and especially magnetic tape. It will be described as applied to magnetic tape, but it should be understood that many features of the invention can also be used for motion picture film.

One of the difficult problems in the uses of thin, magnetically sensitive, plastic tape for information, message, or entertainment use, is the storing and handling of long lengths of the tape. Conventionally, the tape is spooled or wound, one layer on top of another, onto a flanged hub. About twelve hundred feet of the tape can be stored on a reel approximately seven inches in diameter.

To either record information on the tape or recover the information after it has been recorded, the tape is unwound from the storage reel (sometimes referred to as the supply reel) and accurately guided past a play or recording magnetic head, and the tape is clamped between a shaft (capstan) rotating at a constant speed and a back-up roller made of rubber or other resilient material. The capstan is usually of relatively small diameter, approximately one-half inch or less, and its speed is such as to provide a standardized tape velocity. Speeds of 15; 7½; 3¾; and 1⅞ inches per second are standard speeds. By using the standardized tape velocity, the same tape may be played on any machine operating at that speed.

After the tape has left the capstan and back-up roller, it must again be stored. This is usually accomplished by winding it on a flanged hub identical with the supply reel or at least similar to the supply reel. In order to replay the tape a second time, it must be rewound onto the supply reel.

It is an object of this invention to provide an improved device for the storage of long, thin plastic or paper tape, and a storage which does not require rewinding. Also the new tape handling device of this invention can be used in apparatus without any capstan and back-up roller to provide tape motion at a constant velocity. It does not need threading during or after each use, and it can be operated at high tape velocities.

The invention relates more particularly to inside-outside tape cartridges which have the tape withdrawn from the inside of a coil and passed through a loop and across guide means back to the outside of the coil. The tape is of continuous length. Tape storage devices of this type, in the past, have had a number of disadvantages; most of which have related to the feeding of the tape through the loops with the necessary tensions on the tape and without breaking or stretching the tape.

Another object of the invention is to provide novel means for withdrawing tape from the inside of the coil and feeding it through the loop and back to the outside convolution of the coil.

Other objects of the invention are to provide unitary and compact assemblies consisting of cartridges which include a housing having the coil and the driving means enclosed together within the cartridge and with convenient means for moving the loop across recording or reproducing heads which may be located outside of the cartridge or which may be projected into the cartridge through openings in one side of the cartridge housing.

Other objects, features and advantages of the invention will appear or be pointed out as the description proceeds.

In the drawing, forming a part hereof, in which like reference characters indicate corresponding parts in all the views.

Figures 1, 2, 3:
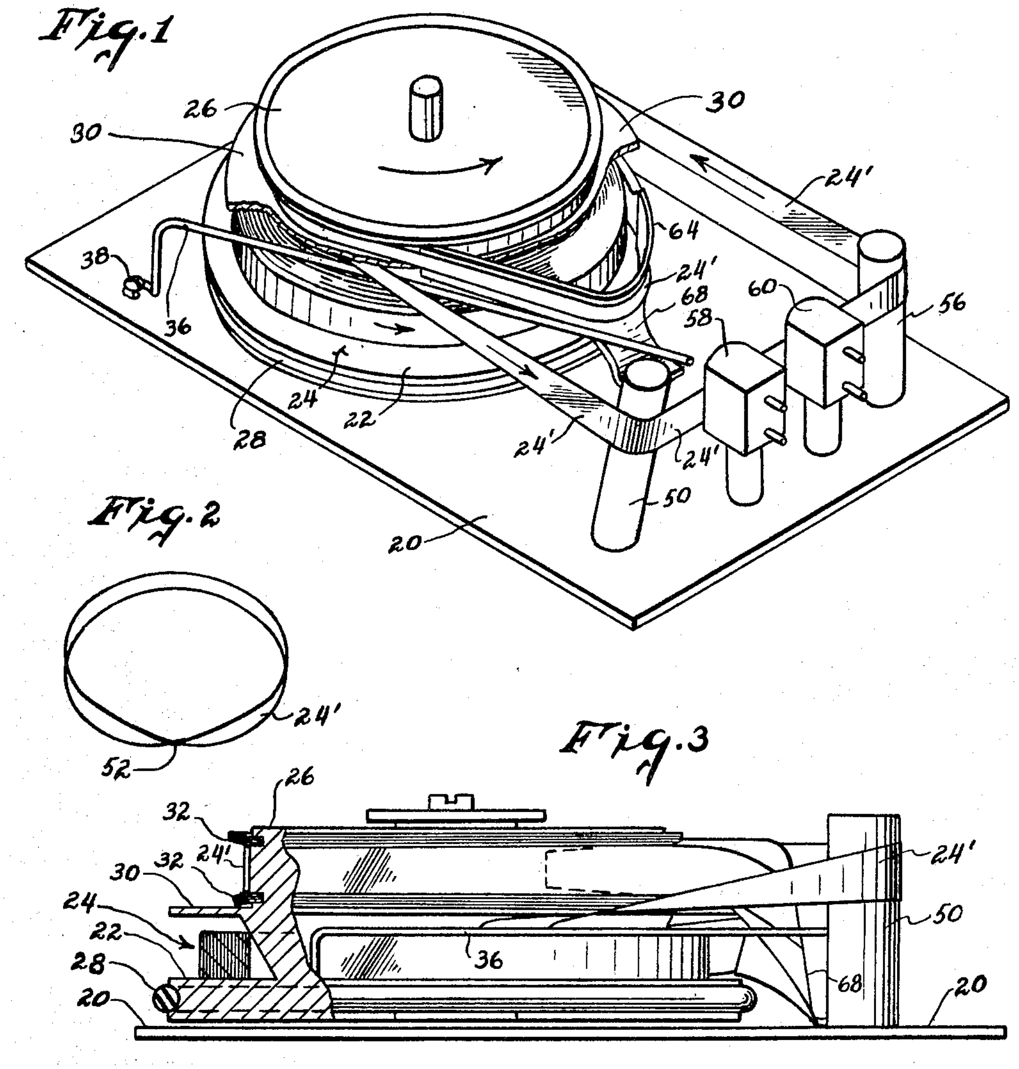
FIGURE 1 is a diagrammatic, perspective view showing a coil of tape carried on a support and with means for withdrawing it from inside of the coil and passing it through a loop, past recording or reproducing heads and back to the outside of the coil in accordance with this invention.
FIGURE 2 is a diagrammatic view showing a Moebius loop which is used in the preferred construction of this invention.
FIGURE 3 is a side elevation, partly broken away in section, of the apparatus shown in FIGURE 1.
Figure 4:
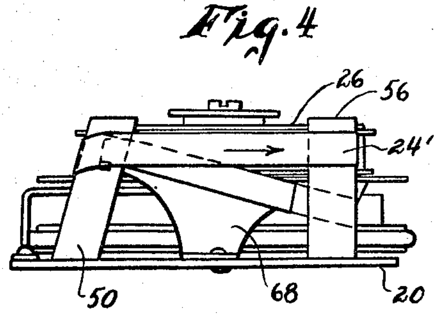
FIGURE 4 is an end view on a reduced scale, of the apparatus shown in FIGURES 1 and 3.
Figures 5, 6, 6A, 7, 8:
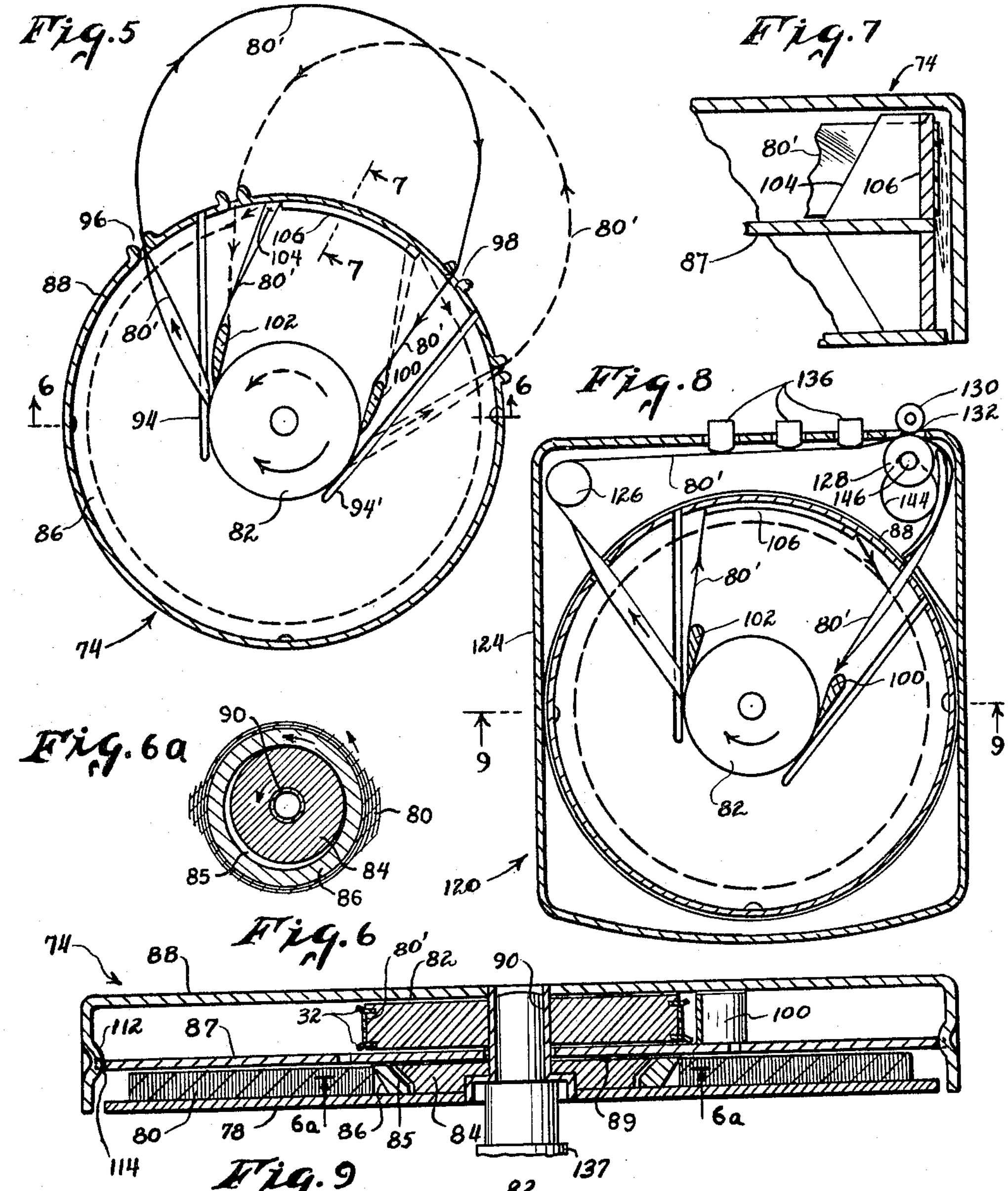
FIGURE 5 is a sectional view of a unitary cartridge embodying a modified form of the invention.
FIGURE 6 is a sectional view, on an enlarged scale, taken on the line 6—6 of FIGURE 5.
Figure 9:
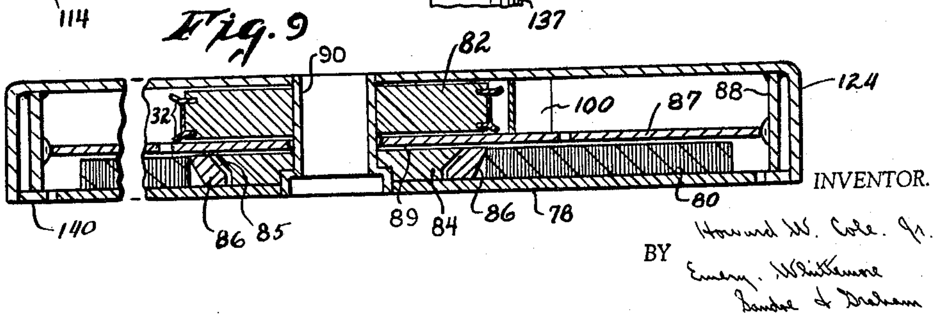
Figures 10, 11, 12, 13, 14, 15, 16:
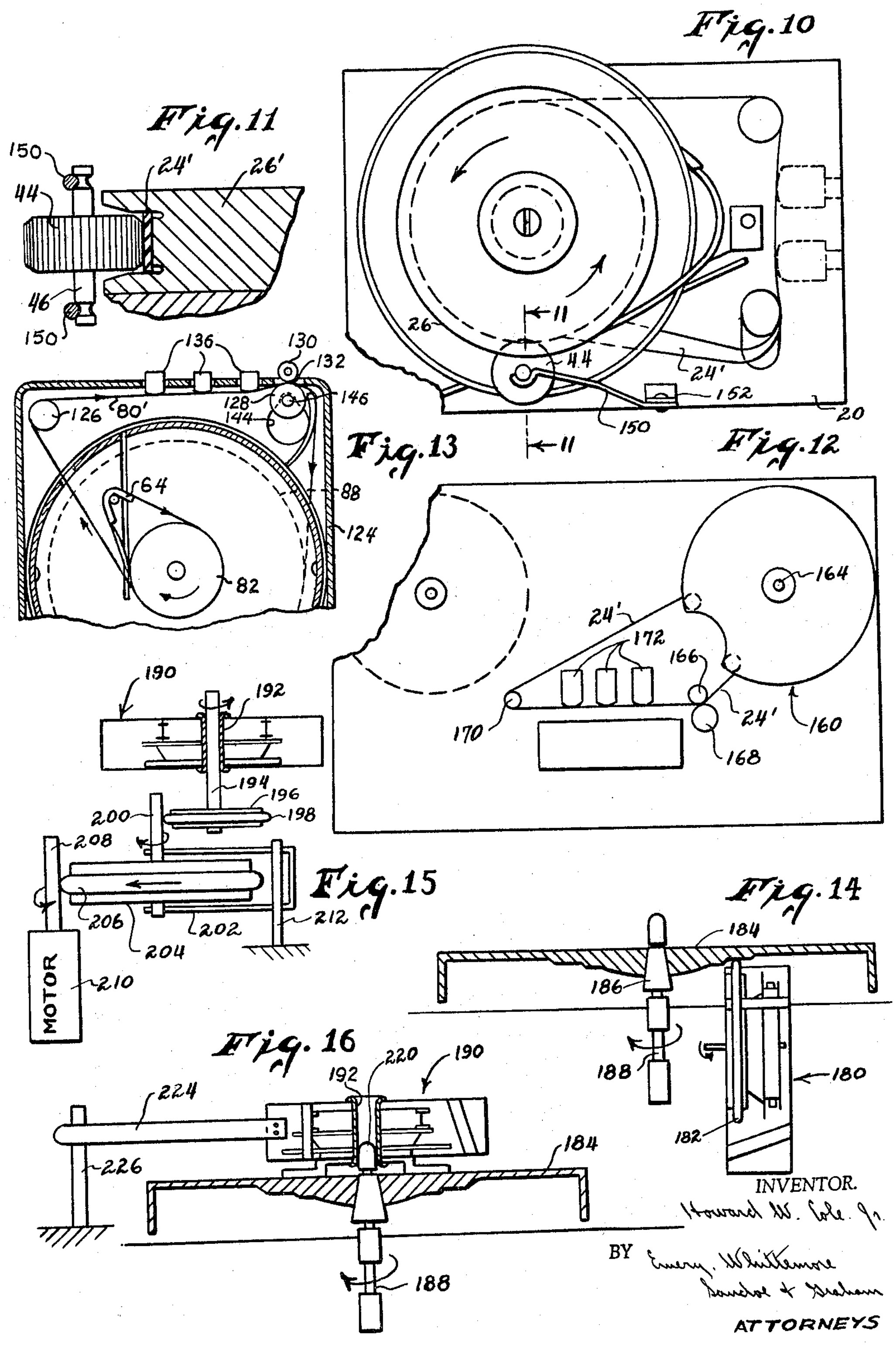

FIGURE 6*a* is a diagrammatic view illustrating the way in which the ring of FIGURE 6 rolls on the hub;

FIGURE 7 is a fragmentary sectional view, on a still larger scale, of a portion of the apparatus shown in FIGURE 5, the section being taken on the line 7—7 of FIGURE 5;

FIGURE 8 is a sectional view, similar to FIGURE 5, but showing a modified cartirdge of the invention;

FIGURE 9 is an enlarged, sectional view taken on the line 9—9 of FIGURE 8;

FIGURE 10 is a top plan view of the apparatus shown in FIGURE 1 but with a modified construction of the drum for driving the tape;

FIGURE 11 is a greatly enlarged sectional view taken on the line 11—11 of FIGURE 10;

FIGURE 12 is a diagrammatic, top plan view of a conventional tape recording apparatus to which the invention is applied;

FIGURE 13 is a view similar to FIGURE 8 but showing a modified construction in which a capstan supplies the power for pulling moving the tape;

FIGURE 14 is a diagrammatic view, mostly in section, showing a combination in which a unitary cartridge of this invention is driven from the turn-table of a record player;

FIGURE 15 is a sectional view, largely diagrammatic, showing another form of unitary cartridge with different driving means from that shown in FIGURE 14; and FIGURE 16 is a view similar to FIGURE 14, but showing still another modification of the unitary cartridge with different means for rotating the drum within the cartridge from a turn-table of a record player.

FIGURE 1 shows a base 20 having a flange or support 22 for a coil 24 of film or magnetic tape. There is a drum 26 rotated above the coil 24, and the drum 26 is connected to the support 22, as shown in section in FIGURE 3.

Referring specifically to FIGURE 3, the support 22 has a circumferential groove for receiving a belt 28 that rotates the support 22, and the drum 26 is integrally connected with the support 22.

The portion of the support 22 which is rotated inside the coil 24 is of truncated conical contour and provides a sloping surface which tapers to a smaller diameter toward its lower end.

This surface is useful in guiding the inside convolution of the coil 24 as it is withdrawn from the coil in a manner which will be explained.

There is a flange 30 located above the coil 24. The drum 26, above the flange 30, has resilient rims 32, which are spaced from one another by a distance slightly less than the width of the tape 24'. The tape displaces these rims 32 and thereby provides a pressure between the rims and the tape for obtaining a substantial friction by which the drum drives the tape 24'.

The effective coil diameter is at the point of contact of the inner convolution of the coil 24 with the conical surface of the support 22. This conical surface is provided to facilitate pulling the tape up and out of the center of the coil. The cone angle is important in determining the final direction the tape will assume after leaving the hub portion of the support 22. Being a continuous loop of the same piece of tape, the tape linear velocity must be the same at all places along its length regardless of its length, therefore, the effective diameter of the drum and the effective diameter of the hub portion of the support 22 must be the same if the tape is to run around both without slippage and with negligible tape tension.

By reducing slightly the diameter of the conical hub portion of the support 22 where it contacts with the coil 24 so that this diameter is slightly less than that of the drum 26, the tape is made to slip slightly on the tapered hub portion as the tape is pulled out. Thus a certain amount of tension is required to withdraw the tape.

The smaller the effective diameter of the hub, compared to the drum, the greater will be the tape tension. This tape tension can be used to keep the tape in intimate contact with the magnetic recording or reproducing heads.

The conical surface of the hub can be made with a larger diameter so that the effective diameter where the inner convolution of the coil contacts with the hub is of greater diameter than the drum. The tape then feeds without tension. Without tape tension, some other means are used to hold the tape against the heads. It is, of course, important that the tape tension, where tension is used, be a constant amount regardless of the amount of tape on the coil. It must be essentially independent of the tape velocity.

To assure that the tape will always contact the conical surface of the hub at the same effective diameter, a guide wire 36 is provided for holding the coil 24 down on the underlying surface of the support 22 at all times. This guide wire 36 is secured to the base 20 by suitable means such as a screw 38.

Where tension of the tape 24' comes from the coil under tension, this tension may be relied upon to obtain the necessary friction for preventing the tape from slipping on the drum 26. On a drum without the rims 32, and under conditions where the apparatus is not in operation, tension may not be sufficient to prevent slippage when the drum is initially started.

In any installation where such conditions are encountered, auxiliary means may be provided for increasing friction of the tape 24' against the drum 26. Instead of rims 32, a small rubber back-up roller, such as the roller 44, shown in FIGURE 11, can be used. This roller has an axle 46 and is urged toward the drum 26' by any suitable means to hold the tape 24' against the drum with more friction. Actually the drum 26' is a somewhat different construction than the drum 26 shown in FIGURES 1 and 3 as will be explained more fully in connection with FIGURE 10.

As the tape 24' comes from the inside of the coil 24 to the first guide means comprising a stanchion 50, the tape 24 passes through a Moebius twist or loop 52. The principle of this Moebius loop is illustrated in FIGURE 2 where the length of the tape is shortened in order to better illustrate the construction. By providing this twist to the length of tape 24', twice the playing time per length of tape is achieved. On the first time around, one side of the tape is against the face of the magnetic heads, and on the second time around, the other side is against the face of the heads.

This Moebius twist is located betwen the center of the coil 24 and tilted stanchion 50 attached to and extending upwardly from the base 20. If the tape 24' from the coil hub were twisted in the opposite direction, the tape would not have the Moebius twist and the same side of the tape would always be in contact with the faces of the magnetic heads, regardless of the number of times the entire length of the tape traversed the heads.

The slope or tilt of the stanchion 50 is correlated with the angle of the conical surface of the hub of the support 22 and with the angle at which the run of tape 24' rises from the coil 24 so as to obtain a horizontal run for the tape 24' between the tilting stanchion 50 and a vertical stanchion 56 located on the other side of the base 20. This horizontal run of the tape 24', between the stanchion 50 and 56 is the one which passes across recording or reproducing heads. In the construction shown, a recording head 58 is in contact with the tape 24' just beyond the tilting stanchion 50 and a reproducing head 60 is located between the recording head 58 and the stanchion 56. This reproducing head 60 can be used as a play-back head to reproduce the recording placed on the tape by the head 58.

The run 24' beyond the tilting stanchion 50 is at the level of the drum 26. The tape 24' passes from the stanchion 56 to the drum 26 and after passing around most of the circumference of the drum, the tape 24' passes to a guide 64, which leads the tape downwardly again to the level of the coil 24 so that the tape wraps around the outside of the coil 24 to form an outer convolution of the coil. The guide 64 has a leg 68 which extends downwardly and is attached to the base 20.

One of the outstanding advantages of the construction shown in FIGURES 1 and 3 is that the drum 26 which moves the tape 24' is of much larger diameter than are the capstans used with conventional tape-recording reels. This large diameter gives the drum 26 a relatively slow rotational speed for a given tape velocity. This greatly reduces any variation in tape velocity as the result of eccentricities in the drum or variations in the pressure of the tape against the drum, or dirt on the tape or drum surface.

FIGURES 5–7 show a unitary cartridge for more convenient handling of the tape with its support and driving drum in accordance with this invention. This cartridge can be completely contained within a seven-inch diameter so that it can be mounted in place of the conventional seven-inch take-up reel popular on commercial tape recorders.

The cartridge, FIGURES 5–7, indicated generally by the reference character 74, includes a flange or support 78, best shown in FIGURE 6, on which a coil 80 of tape rests. There is a drum 82 which is generally similar to the drum 26 of FIGURES 1 and 3, and the drum connects with a hub 84 which has a sloping circumferential face 85. A ring 86 surrounds the hub 84 and has an inside face confronting the face 85 of the hub and with a complementary slope. The inside diameter of the ring 86 at each level is somewhat larger than the outside diameter of the hub 84 at the same level.

The outside of the ring 86 has the same frusto-conical face as the support 22 previously described. The ring 86, however, gives the cartridge of FIGURE 6 a somewhat more flexible action in the winding and unwinding of tape under different operating conditions. FIGURE 6*a* shows the way in which the ring 86 can roll around the hub 84.

For example, when the ring 86 is stationary and a given length of film is fed back to the outside of the coil 80, an equal length of film is fed out from the inside of the coil as the coil turns with the flange 78.

The drum 82 has the rubber rims 32 for maintaining friction of the tape 80' on the drum. The flange 87 fits into a circumferential groove 89 in the drum 82; and includes a housing 88 covering the entire top of the cartridge and extending downwardly around the circumferential side of the cartridge. There is a bushing 90 which extends through the hub 84 and drum 82 and to which the hub, and drum and the flange or support 78 are secured. This bushing 90 extends upwardly into the housing 88.

When the tape 80′ is being used, the bushing 90 rotates and carries with it the support 78, the drum 82 and the hub 84, all of which rotate as a unit. The flange 87 and the housing 88 remain stationary and the circumferential groove 89 into which the inner edge of the flange 87 extends has sufficient running clearance for the hub 82 to turn without moving the flange 87.

FIGURE 5 shows the way in which the tape 80′ passes from the inside of the coil 80 to an outside loop beyond the cartridge 74 and back into the cartridge and to the outside of the coil 80.

The tape 80′ comes up from the space below the partition or flange 87 through a slot 94 and passes out of the cartridge through another slot 96 in the wall of the housing 88. The tape 80′ follows the full-line contour past the recording or reproducing heads, not shown, and returns to the cartridge through a slot 98 in the housing.

Within the housing again, the tape 80′ passes a guide 100 and from the guide follows around a part of the circumferential surface of the drum 82. The tape 80′ is led away from the drum 82 by another guide 102 and from this guide the tape 80′ passes across a sloping edge 104 of FIGURE 7 of another guide 106 which leads the tape downwardly past the circumferential edge of the flange 87 and to the level of the coil of tape below the flange 87 where the tape 80′ wraps around the outside of the coil.

FIGURE 5 shows, in dotted lines, the way in which the tape 80′ passes out of and back to the cartridge 74 when the direction of rotation of the drum is to be in the opposite direction. The full-line tape course, shown in FIGURE 5, corresponds to a clockwise rotation of the drum 82, as indicated by the full-line arrow on the drum; and the dotted-line course for the tape 80′ indicates the course followed when the rotation of the drum is to be in a counter-clockwise direction as indicated by the dotted arrow on the drum 82.

When threading the tape 80′ through the various slots in the flange 87 and inside of the housing, it must be known whether the cartridge is being set up for clockwise or counter-clockwise rotation.

FIGURE 5 shows slots 94′, 96′ and 98′ corresponding to the slots 94, 96 and 98 so that the cartridge can be threaded for rotation in either direction for the dotted-line course of the tape 80′. The most home recorders have counter-clockwise rotation. The use of the cartridge 74 on a tape recorder will be described more fully in connection with FIGURE 12.

Referring again to FIGURE 6, the flange 87 is supported from the hub 84 by the circumferential groove 89 in the hub into which the flange 87 extends; but the flange 87 is held against rotation by indentations 112 which extend into notches 114 in the circumferential edge of the flange 87. The guide 100 is attached to the flange 87 and extends upwardly therefrom. The guide 102 (FIGURE 5) is also connected to the flange 87 but is not shown in FIGURE 6 because it is behind the drum 82.

FIGURES 8 and 9 show another modification of the invention in which a cartridge 120 is constructed so that the tape 80′ never has to pass outside of the cartridge. The construction shown in FIGURES 8 and 9 is similar in many respects to that shown in FIGURES 5–7 and corresponding parts are indicated by the same reference characters. The cartridge 120 differs from the cartridge 74 however, principally in the providing of an outer housing 124 which completely encloses the housing 88 and which also encloses a guide 126. When the cartridge 120 is in operation there is also a back-up roller 128 within the housing 124 over which the tape 80′ passes and against which it is held by a capstan 130 located outside of the cartridge but extending into contact with the tape 80 through an opening 132 in the side wall of the housing 124. There are also recording or reproducing heads 136 which extend through openings in the side wall of the housing 124 which contact with the tape 80′.

After passing the capstan 130 and the back-up roller 128, the tape 80′ passes into the inner housing 88 and around the guide 100 to the drum 82. The guide 102 leads the tape 80′ to the guide 106 around which the tape travels to the level below the flange 87 and back to the outside of the coil in the manner already explained in connection with FIGURES 5–7. The capstan 130 advances the tape 80′ past the heads 136 but does not drive the drum 82. The drive for the drum is from a separate source of power, preferably through a conventional slip clutch 137 to compensate for any differences in the lineal speed imparted to the tape by the capstan 130 and the drum 82.

The cartridge 120 (FIGURES 8–9) has a bottom 140 for the outer housing 124, and this bottom 140 covers substantially all of the lower part of the cartridge 120, except the part which is covered by the support 78. The bottom 140 is attached to the side wall of the housing 124 and remains stationary, whereas the support 78 rotates with the drum 82 in a manner already explained.

The back-up roller 128 is not in the housing 124, except when the cartridge 120 is mounted on a recording or reproducing machine. There is an opening 144 in the bottom 140 of the housing 124 and this opening 144 is somewhat larger in diameter than the back-up roller 128. The back-up roller is introduced into the housing 124, by lowering the cartridge over the roller 128 so that the roller rises into the cartridge through the opening 144. The cartridge is then moved so as to bring the upper wall (FIGURE 8) toward the back-up roller 128, and this brings the loop of the tape 80′ to the contact with the back-up roller.

There is an off-set portion of the opening 144 to provide clearance for a shaft 146 by which the back-up roller 128 is carried. After the cartridge is in position, with respect to back-up roller 128, the recording or reproducing heads 136 are introduced into the cartridge through the openings provided for this purpose and the capstan 130 is brought into contact with the tape 80′ on the side opposite the back-up roller 128.

FIGURES 10 and 11 show a construction which is substantially that shown in FIGURES 1–4 except that friction of the tape 24′, against the drum 26, is obtained in a different way. As previously explained, a roller 44 is urged against the outside of the tape 24′ so as to hold the tape against the circumferential surface of the drum 26 with sufficient pressure to obtain the necessary friction, even when the tape is under no tension during the initial starting up of the apparatus.

The roller 44 is urged against the drum 26 by springs 150 attached to brackets 152 extending upwardly from the base 20.

FIGURE 12 shows the way in which a cartridge 160 can be used on a convenient tape recorder. The cartridge 160 is mounted on a shaft 164 of the tape recorder. This shaft 164 is the conventional spool holder for the take-up reel of the tape recorder. The tape 24′ is withdrawn from the cartridge 160 by a capstan 166 operating in conjunction with a back-up roller 168, pulls the tape 24′ out of the cartridge and around the guide roller 170 ahead of recording and reproducing heads 172. The tape, after passing the magnetic heads 172, and the capstan 166 in back of roller 168 passes around the drum in the cartridge and in turn onto the outside of the coil as in FIGURE 8. The shaft 164 is driven through the usual slip clutch and the feed rolls 166 and 168 which pull the tape past the heads 172 hold the tape back to control the rate at which the drum is rotated through the slip clutch.

In the usual tape recorder, the take-up reel is driven through a slip clutch device so that a small amount of tape tension is maintained in winding up the tape as it is driven by the capstan back-roll mechanism. By mounting the cartridge 160 on a take-up reel shaft 164, which has a slip clutch device, the combination of both the "drum type" operation and the "tape pull" operation results.

This combination drive is most beneficial in that the capstan and back-up roller can operate as a tape velocity regulator instead of providing the entire operating power as is conventional in other continuous loop devices.

FIGURE 13 shows another modified form of the invention in which tape 80*a* is pulled by the capstan 130 and back-up roller 128 past heads 136 and around a guide roll 126. The tape 80*a* comes to the roller 128 directly from a drum 82*a*.

Before passing around most of the periphery of the drum 82*a*, the tape 80*a* passes around a guide 64, and the tape from the inside convolution of the coil of tape comes up to the guide 64 through a slot 94 in the partition 87. After passing the capstan 130, the tape 80*a* travels directly to the outside of the coil as indicated by the arrow head beyond the capstan 130 in FIGURE 13.

The system shown in FIGURE 13 uses a construction such as illustrated in FIGURE 9 but with the effective diameter of the drum somewhat smaller than the inside convolution of the coil of tape. The flange 78 turns somewhat faster than the coil of tape and urges the tape to feed from the inside of the coil, but the tape cannot feed any faster than the capstan 130 permits tape to wrap on the outside of the coil and the flange 78 slips, therefore, under the tape to the extent necessary to allow for the differences in speeds.

FIGURE 14 shows one way in which the tape support and drum may be rotated at constant speed.

A cartridge 180, which is generally similar to the construction shown in FIGURES 1–3, is provided with a rubber tire 182 placed in the circumferential groove in which the belt 28 of FIGURE 3 runs. This tire 182 contacts with the bottom surface of a turntable 184 of a record player. The turntable 184 is mounted on a hub 186 of a spindle 188 of the record player. Since the spindle is driven at a constant and closely governed speed, the apparatus in the cartridge is similarly driven at a constant and regulated speed. The actual speed can be adjusted by moving the tire 182 radially with respect to the turntable 184. Ordinarily the tire 182 should contact with the bottom of the turntable 184 at a radial distance from the axis of the spindle 188 equal to the effective radius of the tire 182.

No apparatus for holding the cartridge 180 against the bottom of the turntable 184 is shown, since this will be apparent to those skilled in the art. Spring loading is, of course, desirable in order to allow the cartridge to follow the turntable variations, eccentricities or other manufacturing tolerances.

FIGURE 15 shows diagrammatically a machine designed specifically to drive a cartridge 190. This cartridge has a driving bushing 192 to which a shaft 194 is connected. There is a roller 196 secured to the lower end of the shaft 194 and there is a rubber tire 198 on the roller 196.

The tire 198 is driven from a shaft 200 carried by bearings of a frame 202 and on which a fly wheel 204 is secured. The fly wheel 204 has a rubber tire 206 in contact with the shaft 208 of a motor 210. The frame 202 can be swung about a third shaft 212 to move the fly wheel out of contact with shaft 208 when the motor drive is to be disconnected. The cartridge 190 is removed from this apparatus by lifting the bushing 192 from the shaft 194. Other cartridges can be put in playing position by slipping their driving bushings over the shaft 194.

FIGURE 16 shows the cartridge 190 driven from the turntable 184 by placing the driving bushing 192 of the cartrtidge directly over the center post 220 of the turntable spindle 188. The housing of the cartridge 190 is held against rotation by an arm 224 attached to a post 226 at one side of the record player beyond the turntable 184. The cartridge 190 can be placed on top of a record on the turntable 184 so that the record can be played simultaneously with the operation of the tape in the cartridge 190.

The apparatus of this invention has many applications in various fields where a continuously repetitive recording is desired. It can be used for fire warning devices; maintenance; monitoring and surveillance of operations; advertising and its associated campaigning; instruction and educational programs; instrumentation and many other places.

The preferred embodiment and a number of modifications have been illustrated and described, but changes and other modifications can be made and some features can be used in different combinations without departing from the invention as defined in the claims.

What is claimed is:

1. A film feed device including a hub with a flange having an annular surface, a spiral coil of film supported entirely by said annular surface and on which the coil of film rests, the coil having its inside convolution connected to the outside convolution to make the coil of film continuous, a driving drum in axial alignment with the hub and adjacent thereto and having a peripheral surface for contact with a loop of the film for imparting lineal movement to the film, the drum being connected with the hub and flange and rotable as a unit therewith, the drum diameter being correlated with the effective diameter of the coil of film to rotate the flange at different lineal speed from that of most of the convolutions of the coil of film that are resting on said flange, guide means around which a loop of film passes from the inside of the coil to the drum and around a portion of the peripheral surface of the drum in contact therewith, and other guide means around which the loop of film travels from the drum to the outside of the coil.

2. The film feed device described in claim 1 and in which the circumferential surface of the hub is a truncated conical surface with its minimum diameter at the juncture of the hub and flange, and there is a coil of film resting against the flange with an inner convolution of the film that contacts with the hub, the conical surface of the hub extending beyond the film and providing a sloping surface for determining the angle of the film as it is pulled out of the coil.

3. The film feed device described in claim 2, and in which there is a pressure element holding the coil of film in contact with the flange.

4. The film feed device described in claim 1 and in which the drum has a surface free of sprocket teeth and with a friction surface for driving imperforate film, and there are means for increasing the contact friction of the film on the drum to prevent slippage when the drum begins its initial rotation.

5. The film feed device described in claim 4, and in which there are resilient flanges on the drum forming a channel slightly narrower than the width of the film, and said channel constitutes the means for increasing the friction.

6. A film cartridge comprising a support having a flange with an annular surface, a spiral coil of film supported entirely by said annular surface and that rests on said flange, guide means through which film is withdrawn from the inner convolution of the coil, a part of the guide means being surrounded by the inner convolution of the coil, a drum at the upper part of the cartridge and connected to the support to rotate as a unit therewith, the drum diameter being correlated with the diameter of the coil of film at the point of contact of the inner convolution of the coil with the part of the guide means that is surrounded by said inner convolution to rotate the flange at different lineal speed from that of most of the convolutions of the coil of film that is resting on said flange, said guide means leading a loop of film to said drum, and another guide means around which the film loop is led from the drum and downwardly to the outside of the coil on said support.

7. A film cartridge as described in claim 6, and in which the cartridge has a housing enclosing the coil on the support and enclosing also the drum, the housing having slots therein through which the film loop passes to and from the cartridge.

8. A film cartridge as described in claim 7, and in which the cartridge has a partition dividing it into two compartments including a lower compartment in which the coil is located, and an upper compartment in which the drum is located, and there are openings in the partition through which the film loop travels between the different compartments of the cartridge.

9. The film cartridge as described in claim 8, and in which the support and drum are rotatable with respect to the partition and the housing.

10. The film cartridge as described in claim 6 and in which the film cartridge includes a housing in which the coil of film is enclosed and there are guides at one end of the housing between which a run of the film travels and there is an opening through said end of the housing through which a reproducing head can be inserted into the housing and into contact with the run of film that travels between said guides.

11. The film cartridge described in claim 10, and in which the drum is rotatable independently of the housing, and it has bearings between it and the housing.

12. A tape cartridge assembly including a housing having a chamber in which a coil of tape is located, guide means across which the tape passes in a loop from the inside convolution of the coil and back to the outside of the coil in a continuous length of film with a Moebius loop, a tape driving drum within the cartridge and in a different plane from the coil of tape and having a circumferential surface with which the tape contacts to drive the tape of the coil, the guide means holding one run of tape in position to pass across recording or reproducing heads with which the cartridge is intended to be used, and a driving connection including a shaft within the cartridge and having a roller thereon in position to hold a run of the tape in contact with a power driving element located at least partially outside of the cartridge.

13. A film-feeding device including a hub with a flange for holding a coil of film that has its inside convolution connected to the outside convolution to make the coil of film continuous, the hub extending upwardly from the flange for location within an open interior of the coil, and a ring on the flange and surrounding the hub and having an inside diameter substantially greater than the outside diameter of the hub, said ring being movable radially on the flange into and out of contact with the hub the ring being of an outside diameter to fit within the open interior of the coil of film with which the feed device is intended to be used, and in which the ring has a frusto-conical circumferential face that decreases in diameter as it extends downwardly toward the flange whereby tightening of the inside convolution of the coil on the ring urges the ring upwardly and the film downwardly against the flange.

14. The film-feed device described in claim 13 and in which the ring and hub have confronting faces spaced from one another when the ring and hub are at concentric locations, the ring being movable radially with respect to the hub in response to radial displacement of the coil that surrounds said ring whereby the confronting faces of the hub and ring contact with one another and the hub rotates the ring at an angular speed less than that of the hub.

15. A film feed device including a hub with a flange having an annular surface against which a coil of film rests, the coil having its inside convolution connected to the outside convolution to make the coil of film continuous, a driving drum in axial alignment with the hub and adjacent thereto and having a peripheral surface for contact with a loop of the film, the drum being conected with the hub and flange and rotatable as a unit therewith, the drum diameter being correlated with the effective diameter of the coil of film to rotate the flange at a different speed from that of the coil of film, guide means around which a loop of film passes from the inside of the coil to the drum and around a portion of the peripheral surface of the drum in contact therewith, and other guide means around which the loop of film travels from the drum to the outside of the coil, and in which the effective diameter of the drum is slightly greater than the inside diameter of the film coil so as to maintain the tension on the film as the drum pulls the film from within the coil.

16. A film-feeding device including a hub with a flange for holding a coil of film that has its inside convolution connected to the outside convolution to make the coil of film continuous, the hub extending upwardly from the flange for location within an open interior of the coil, and a ring on the flange and surrounding the hub and having an inside diameter substantially greater than the outside diameter of the hub, said ring being movable radially on the flange into and out of contact with the hub, the ring being of an outside diameter to fit within the open interior of the coil of film with which the feed device is intended to be used, and in which the ring has a frusto-conical circumferential face that decreases in diameter as it extends downwardly toward the flange whereby tightening of the inside convolution of the coil on the ring urges the ring upwardly and the film downwardly against the flange, and in which the hub and flange are connected together for rotation as a unit and the ring is free to move or remain stationary independently of the hub and flange, and there is an upper flange above the coil and ring with means for holding the upper flange stationary while the first flange and the hub rotate, the upper stationary flange being adjacent to the coil and ring whereby upward movement of the ring brings it into contact with the stationary flange to retard rotation of the ring.

References Cited by the Examiner

UNITED STATES PATENTS

| | | | |
|---|---|---|---|
| 1,873,463 | 8/1932 | Oehmichen | 226—190 X |
| 2,238,719 | 4/1941 | De Tartus | 242—55.19 X |
| 2,311,383 | 2/1943 | Hardenberg | 242—55.19 X |
| 2,647,750 | 8/1953 | Camras. | |
| 2,753,127 | 7/1956 | Yudin | 242—74 |
| 2,781,689 | 2/1957 | Heyer | 242—55.19 X |
| 2,837,332 | 6/1958 | Busch | 242—55.19 |
| 2,853,923 | 9/1958 | Daniel | 242—55.19 X |
| 2,951,654 | 9/1960 | Steelman | 242—55.19 X |
| 2,975,988 | 3/1961 | Galluzzi | 242—55.19 |
| 3,030,041 | 4/1962 | Cousino | 242—55.19 |
| 3,065,310 | 10/1962 | Cross | 242—55.19 X |

FOREIGN PATENTS

| | | |
|---|---|---|
| 878,309 | 10/1942 | France. |

FRANK J. COHEN, *Primary Examiner.*

MERVIN STEIN, *Examiner.*

B. S. TAYLOR, *Assistant Examiner.*